US012648557B2

(12) United States Patent　(10) Patent No.:　US 12,648,557 B2

Bowers　(45) Date of Patent:　Jun. 9, 2026

(54) WALL APPARATUS FOR PREVENTING PEST INSTRUSIONS

(71) Applicant: Gerald Bowers, Fresno, TX (US)

(72) Inventor: Gerald Bowers, Fresno, TX (US)

( * ) Notice: Subject to any disclaimer, the term of this patent is extended or adjusted under 35 U.S.C. 154(b) by 203 days.

(21) Appl. No.: 18/378,001

(22) Filed: Oct. 9, 2023

(65) Prior Publication Data

US 2025/0113816 A1　Apr. 10, 2025

(51) Int. Cl.
| *E04F 13/12* | (2006.01) |
| *A01M 29/30* | (2011.01) |
| *E04B 2/72* | (2006.01) |

(52) U.S. Cl.
CPC ............. *A01M 29/30* (2013.01); *E04B 2/721* (2013.01); *E04F 13/12* (2013.01)

(58) Field of Classification Search
CPC .......... A01M 29/30; E04B 2/721; E04B 2/56; E04B 2/72; E04B 2001/02; E04F 13/12
See application file for complete search history.

(56) References Cited

U.S. PATENT DOCUMENTS

| 2,143,288 | A | * | 1/1939 | Stolz | E04B 2/52 |
| | | | | | 52/274 |
| 2,745,523 | A | | 5/1956 | Biggs | |
| 3,568,391 | A | * | 3/1971 | Conway | E04F 19/061 |
| | | | | | 52/364 |
| 4,549,378 | A | * | 10/1985 | Ayers | E04B 1/34342 |
| | | | | | 52/169.12 |

| 4,704,837 | A | | 11/1987 | Menchetti | |
| 4,733,986 | A | * | 3/1988 | Kenning | H02G 3/0608 |
| | | | | | 52/848 |
| 5,003,743 | A | * | 4/1991 | Bifano | E04F 13/08 |
| | | | | | 52/764 |
| 5,669,187 | A | * | 9/1997 | Bushong | E04B 1/72 |
| | | | | | 52/799.12 |
| 5,768,841 | A | | 6/1998 | Swartz | |
| 6,134,847 | A | * | 10/2000 | Bifano | E04D 13/152 |
| | | | | | 52/302.3 |
| 6,276,096 | B1 | * | 8/2001 | Fair | B60P 3/36 |
| | | | | | 52/293.3 |
| 7,036,284 | B1 | * | 5/2006 | Larson | E04F 13/06 |
| | | | | | 52/506.1 |
| 7,681,365 | B2 | * | 3/2010 | Klein | E04B 2/7457 |
| | | | | | 52/302.1 |
| D641,188 | S | | 7/2011 | Lin | |
| 11,466,510 | B2 | * | 10/2022 | Von Ryberg | B29C 48/07 |
| 2005/0221028 | A1 | * | 10/2005 | Westcott | A01M 29/34 |
| | | | | | 428/34.1 |
| 2011/0146180 | A1 | * | 6/2011 | Klein | E04B 2/7453 |
| | | | | | 52/317 |
| 2016/0024788 | A1 | * | 1/2016 | Grisolia | B32B 5/12 |
| | | | | | 52/302.1 |

(Continued)

FOREIGN PATENT DOCUMENTS

CA　　　　1284714　　　6/1991

*Primary Examiner* — Paola Agudelo

(57) ABSTRACT

A wall apparatus for preventing intrusions by pests includes a frame which has a plurality of studs, a sole plate, and a top plate. The studs are laterally spaced from each other and coupled to and extend between the sole plate and the top plate. Each one of a pair of barriers is coupled to the frame adjacent to a bottom end of the frame and is positioned on an associated one of a front side of the frame and a rear side of the frame.

11 Claims, 5 Drawing Sheets

(56)        References Cited

U.S. PATENT DOCUMENTS

| | | | |
|---|---|---|---|
| 2020/0157798 A1* | 5/2020 | Baltz, Jr. | E04D 13/152 |
| 2020/0190800 A1* | 6/2020 | Elliott | E04B 2/7411 |
| 2020/0256078 A1* | 8/2020 | Pospisil | E04B 2/7457 |
| 2021/0025162 A1* | 1/2021 | Wilson | E04B 1/32 |
| 2022/0010614 A1 | 1/2022 | Von Ryberg | |
| 2024/0068229 A1* | 2/2024 | Pospisil | E04B 1/14 |

* cited by examiner

WALL APPARATUS FOR PREVENTING PEST INSTRUSIONS

(b) CROSS-REFERENCE TO RELATED APPLICATIONS

Not Applicable

(c) STATEMENT REGARDING FEDERALLY SPONSORED RESEARCH OR DEVELOPMENT

Not Applicable

(d) THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

(f) STATEMENT REGARDING PRIOR DISCLOSURES BY THE INVENTOR OR JOINT INVENTOR

Not Applicable

(g) BACKGROUND OF THE INVENTION

(1) Field of the Invention

The disclosure relates to wall apparatuses and more particularly pertains to a new wall apparatus for preventing intrusions by pests.

(2) Description of Related Art Including Information Disclosed Under 37 CFR 1.97 and 1.98

The prior art describes barriers to pests like rodents, racoons, and the like using sheet metal barriers. However, the prior art fails to disclose a wall apparatus comprising a frame and barriers attached near the bottom of the frame to inhibit pests from burrowing through the wall.

(h) BRIEF SUMMARY OF THE INVENTION

An embodiment of the disclosure meets the needs presented above by generally comprising a frame which has a plurality of studs, a sole plate, and a top plate. The studs are laterally spaced from each other and coupled to and extend between the sole plate and the top plate. Each one of a pair of barriers is coupled to the frame adjacent to a bottom end of the frame and is positioned on an associated one of a front side of the frame and a rear side of the frame.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

(i) BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

(j) DETAILED DESCRIPTION OF THE INVENTION

Figure 1:
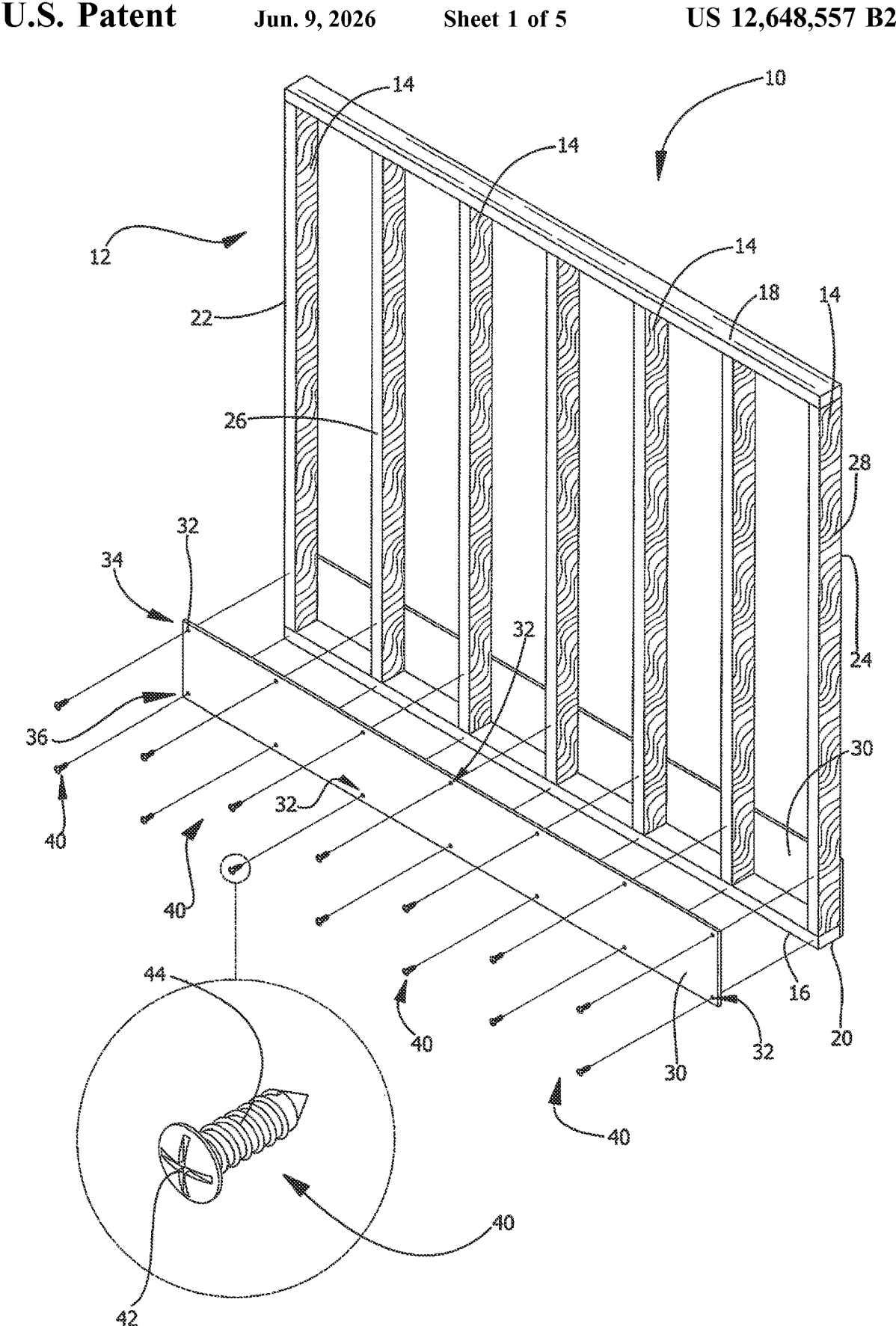
FIG. 1 is an exploded perspective view of a wall apparatus according to an embodiment of the disclosure.
Figure 2:
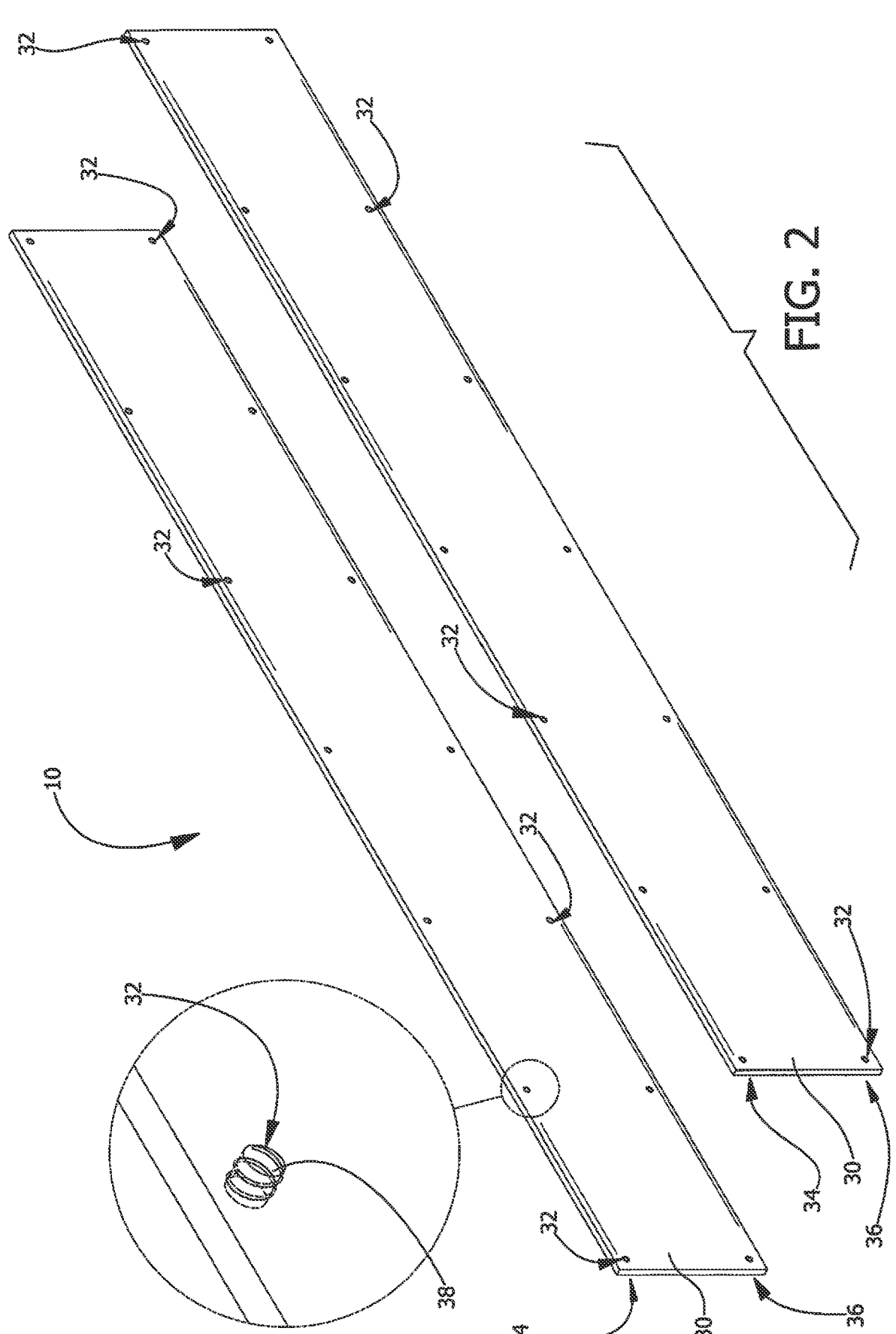
FIG. 2 is a perspective kit view of an embodiment of a pair of barriers of the disclosure.
Figure 3:
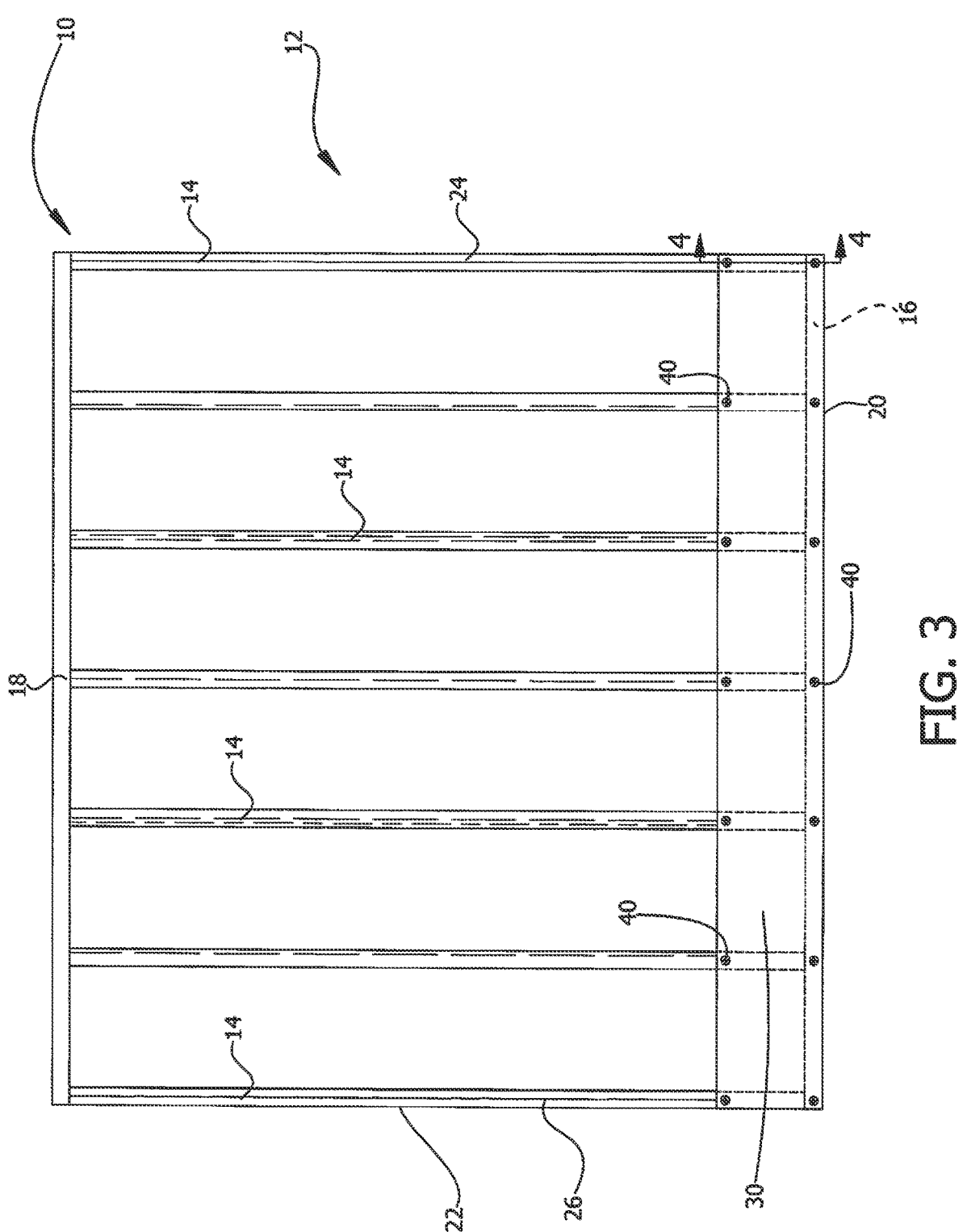
FIG. 3 is a front view of an embodiment of the disclosure.
Figure 4:
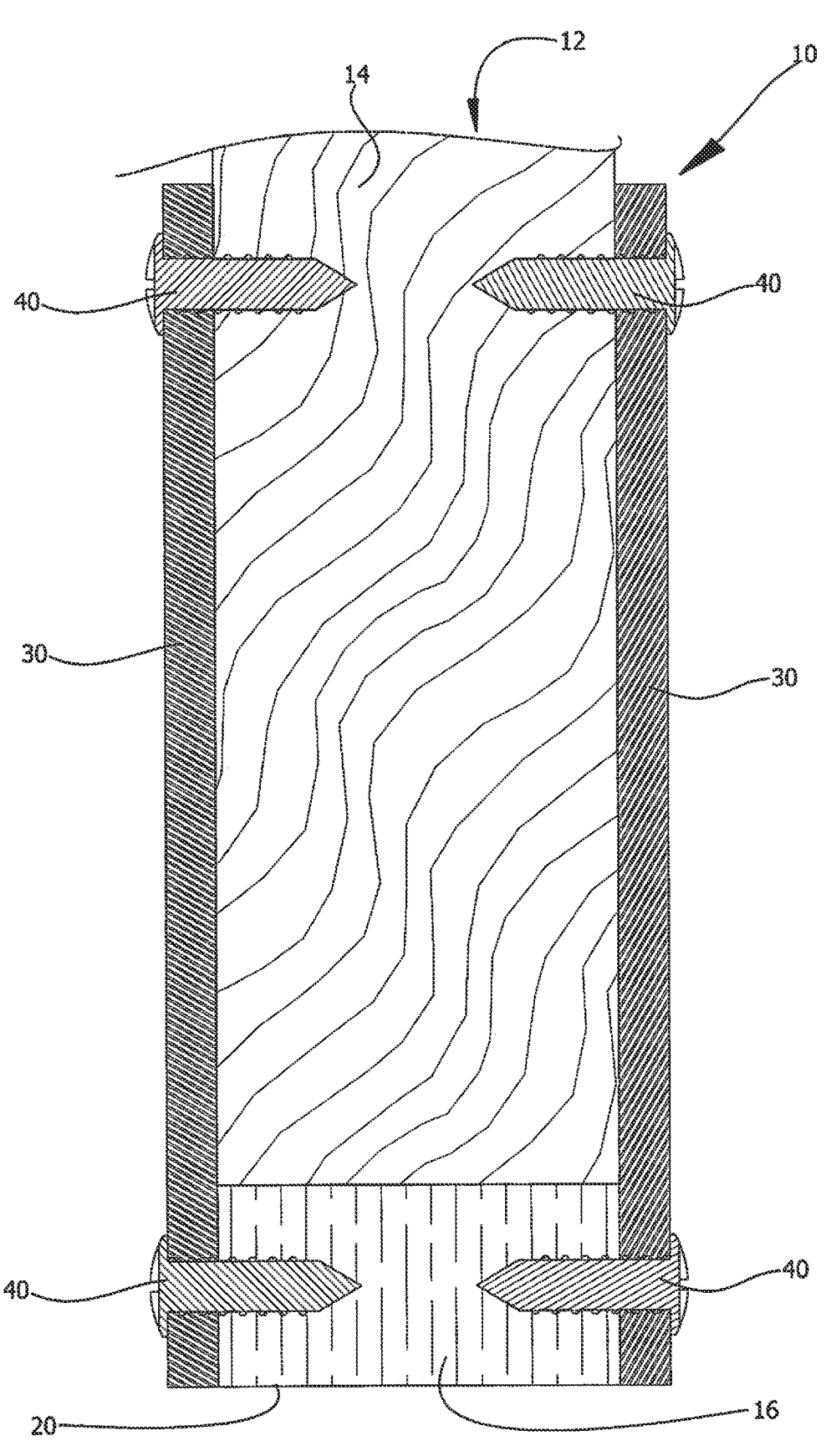
FIG. 4 is a cross section view of an embodiment of the disclosure taken from Arrows 4-4 in FIG. 3.
Figure 5:
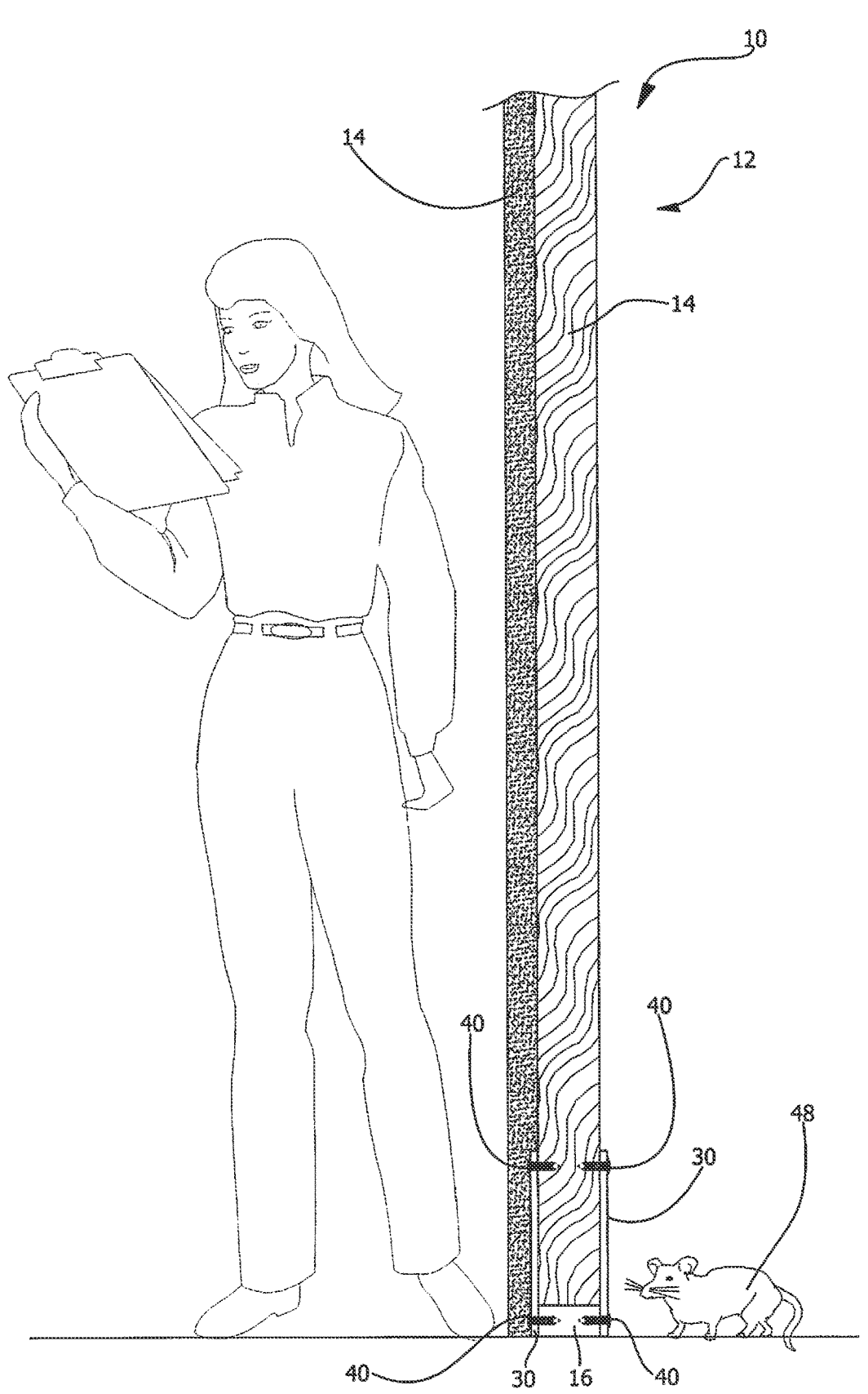
FIG. 5 is an in-use view of an embodiment of the disclosure.

With reference now to the drawings, and in particular to FIGS. 1 through 5 thereof, a new wall apparatus embodying the principles and concepts of an embodiment of the disclosure and generally designated by the reference numeral 10 will be described.

As best illustrated in FIGS. 1 through 5, the wall apparatus 10 generally comprises a frame 12 which has a plurality of studs 14, a sole plate 16, and a top plate 18. The studs 14 are laterally and evenly spaced from each other and are coupled to and extend between the sole plate 16 and the top plate 18. It is appreciated that the frame 12 may comprise alternative or additional members which define an interior structure to the wall apparatus 10. The studs 14, the sole plate 16, and the top plate 18 may comprise a wood material or any suitable material for delineating space within or without a building structure.

Each one of a pair of barriers 30 is coupled to the frame 12 adjacent to a bottom end 20 of the frame 12. Each barrier 30 of the pair of barriers 30 is positioned on an associated one of a front side 26 of the frame 12 and a rear side 28 of the frame 12, and each barrier 30 extends from a first lateral end 22 of the frame 12 to a second lateral end 24 of the frame 12. Each barrier 30 comprises a sheet metal material but may comprise any material which resists damage from rodents, racoons, or similar pests. Each barrier 30 of the pair of barriers 30 has a plurality of holes 32 which extends through the barrier 30. The holes 32 are arranged in an upper row 34 and a lower row 36 which each extend laterally with respect to the frame 12. Each hole 32 of the upper row 34 of the plurality of holes 32 is aligned with an associated stud 14 of the plurality of studs 14, and each hole 32 of the lower row 36 of the plurality of holes 32 is aligned with the sole plate 16. Each hole 32 of the lower row 36 is positioned vertically below an associated hole 32 of the upper row 34. In some embodiments, the holes 32 of the lower row 36 may also align with associated studs 14 of the plurality of studs 14.

Each one of a plurality of connectors 40 is coupled to an associated barrier 30 of the pair of barriers 30 and the frame 12. Each connector 40 of the plurality of connectors 40 extends through an associated hole 32 of the plurality of holes 32. Each connector 40 comprises a threaded fastener 42 has external threads 44 which are complementary in shape to internal threads 38 of the associated hole 32. The connectors 40 also may comprise nails, ties, clamps, or the like. A panel 46 constructed of drywall is coupled to the frame 12 and lies against the front side 26 of the frame 12. The panel 46 has a notch accommodating the barrier 30 positioned on the front side 26 of the frame 12.

In use, the wall apparatus 10 is used as an element in a building to separate rooms and exterior spaces for the building. Pests 48 which attempt to burrow through the wall apparatus 10 near the bottom end 20 of the frame 12 will be inhibited by one of the barriers 30. Thus, a risk of intrusion of the pests 48 into the building or between rooms will be lessened.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A wall apparatus for preventing intrusions of pests, the apparatus comprising:
   a frame, the frame comprising a plurality of studs, a sole plate, and a top plate, the plurality of studs being coupled to and extending between the sole plate and the top plate, the plurality of studs being laterally spaced from each other;
   a pair of barriers, each barrier of the pair of barriers being separately coupled to the frame adjacent to a bottom end of the frame, each barrier of the pair of barriers being positioned on an associated one of a front side of the frame and a rear side of the frame, each barrier having a lowermost edge, the lowermost edge of each barrier being aligned with a bottommost edge of the frame and extending upwardly from the bottommost edge wherein a bottom face of the frame is exposed between the bottommost edges of the barriers; and
   a panel being coupled to the frame, the panel lying against the front side of the frame, the panel having a notch accommodating the barrier positioned on the front side of the frame.

2. The apparatus of claim 1, wherein each barrier of pair of barriers extends from a first lateral end of the frame to a second lateral end of the frame.

3. The apparatus of claim 1, wherein each barrier of the pair of barriers comprises a sheet metal material.

4. The apparatus of claim 1, wherein each barrier of the pair of barriers has a plurality of holes extending through the barrier, the plurality of holes being arranged in an upper row and a lower row, the upper row and the lower row extending laterally with respect to the frame.

5. The apparatus of claim 4, wherein each hole of the upper row of the plurality of holes is aligned with an associated stud of the plurality of studs.

6. The apparatus of claim 4, wherein each hole of the lower row of the plurality of holes is aligned with the sole plate.

7. The apparatus of claim 4, further comprising a plurality of connectors, each connector of the plurality of connectors being coupled to an associated barrier of the pair of barriers and the frame, each connector of the plurality of connectors extending through an associated hole of the plurality of holes.

8. The apparatus of claim 7, wherein each connector of the plurality of connectors comprises a threaded fastener having external threads which are complementary in shape to internal threads of the associated hole.

9. The apparatus of claim 1, further comprising a plurality of connectors, each connector of the plurality of connectors being coupled to an associated barrier of the pair of barriers and the frame.

10. The apparatus of claim 1, wherein the panel comprises drywall.

11. A wall apparatus for preventing intrusions of pests, the apparatus comprising:
   a frame, the frame comprising a plurality of studs, a sole plate, and a top plate, the plurality of studs being coupled to and extending between the sole plate and the top plate, the plurality of studs being laterally spaced from each other, the plurality of studs being evenly spaced from each other;
   a pair of barriers, each barrier of the pair of barriers being separately coupled to the frame adjacent to a bottom end of the frame, each barrier of the pair of barriers being positioned on an associated one of a front side of the frame and a rear side of the frame, each barrier of the pair of barriers extending from a first lateral end of the frame to a second lateral end of the frame, each barrier having a lowermost edge, the lowermost edge of each barrier being aligned with a bottommost edge of the frame and extending upwardly from the bottommost edge wherein a bottom face of the frame is exposed between the bottommost edges of the barriers, each barrier of the pair of barriers comprising a sheet metal material, each barrier of the pair of barriers having a plurality of holes extending through the barrier, the plurality of holes being arranged in an upper row and a lower row, the upper row and the lower row extending laterally with respect to the frame, each hole of the upper row of the plurality of holes being aligned with an associated stud of the plurality of studs, each hole of the lower row of the plurality of holes being aligned with the sole plate;
   a plurality of connectors, each connector of the plurality of connectors being coupled to an associated barrier of the pair of barriers and the frame, each connector of the plurality of connectors extending through an associated hole of the plurality of holes, each connector of the plurality of connectors comprising a threaded fastener having external threads which are complementary in shape to internal threads of the associated hole; and
   a panel being coupled to the frame, the panel lying against the front side of the frame, the panel having a notch accommodating the barrier positioned on the front side of the frame, the panel comprising drywall.

* * * * *